(12) United States Patent
Lin

(10) Patent No.: US 8,248,998 B2
(45) Date of Patent: Aug. 21, 2012

(54) TELECOMMUNICATION NETWORK TRANSMISSION DIVERGENCE SYSTEM AND METHOD

(75) Inventor: Yi-Neng Lin, Hsinchu (TW)

(73) Assignee: Fiber Logic Communications, Inc., Hsinchu (TW)

( * ) Notice: Subject to any disclaimer, the term of this patent is extended or adjusted under 35 U.S.C. 154(b) by 344 days.

(21) Appl. No.: 12/592,000

(22) Filed: Dec. 8, 2009

(65) Prior Publication Data
US 2011/0134830 A1 Jun. 9, 2011

(51) Int. Cl.
*H04W 4/00* (2009.01)
(52) U.S. Cl. .......................... 370/328; 455/445
(58) Field of Classification Search .......... None
See application file for complete search history.

(56) References Cited

U.S. PATENT DOCUMENTS

| | | | |
|---|---|---|---|
| 2005/0216758 A1* | 9/2005 | Matusz et al. | 713/200 |
| 2008/0137595 A1* | 6/2008 | Surazski et al. | 370/329 |
| 2009/0225702 A1* | 9/2009 | Lai | 370/328 |
| 2010/0232293 A1* | 9/2010 | S gfors et al. | 370/235 |
| 2011/0038304 A1* | 2/2011 | Lin et al. | 370/328 |

* cited by examiner

*Primary Examiner* — Anh-Vu Ly
(74) *Attorney, Agent, or Firm* — Rosenberg, Klein & Lee

(57) ABSTRACT

A telecommunication network transmission divergence system and method is disclosed. A first multi-service-packet-control-unit and a second multi-service-packet-control-unit are disposed between a base station and a radio network controller. Packets are diverged to one or more low-stability & long-delay routes based on priorities of the packets. The system and method reduce transmission load of a frame exchange protocol interface (Iub) while maintaining a stable quality of service for divergent packet transmissions. As a result, transmission load and cost are significantly reduced and transmission efficiency is improved.

15 Claims, 4 Drawing Sheets

TELECOMMUNICATION NETWORK TRANSMISSION DIVERGENCE SYSTEM AND METHOD

BACKGROUND OF THE INVENTION

1. Field of the Invention

The present invention relates to a telecommunication network transmission divergence mechanism, and in particular to a telecommunication network transmission divergence system and method that can be implemented in a Universal Mobile Telecommunications System (UMTS) of third generation (3G) mobile communication technology.

2. The Prior Art

In recent years the Universal Mobile Telecommunications System (UMTS) of third generation (3G) mobile communication technology has reached a mature level. As such, the packets of a User Entity (UE) can be transmitted to a base station (Node B), and the packets received by the base station are then transmitted to a Radio Network Controller (RNC) through a Frame Exchange Protocol Interface (Iub), such as T1/E1, Carrier Ethernet, MPLS (Multi-Protocol Labeling Switching, etc.). However, the improvement of networking capability and the advancement of access technology of mobile communication devices have led to serious overloading of the signal transmission facilities and insufficient Frame Exchange Protocol Interface (Iub) bandwidth. Therefore it is an urgent and important task to find an appropriate means of reducing transmission costs and bandwidth requirements within the existing system framework and transmission protocol specifications while maintaining packet transmission quality.

Taiwan Patent Case No. 1243620 discloses in a third generation (3G) Universal Mobile Telecommunications System (UMTS) system adding a RAN IP gateway to serve as an interface for connecting a Time Division Duplex-Radio Local Area Network (TDD-RLAN) to a public Internet. However, the adoption of a RAN IP gateway for supporting packet transmission does not provide adequate means in solving the problem of insufficient transmission bandwidth. Therefore, the efficacy of this approach is not sufficient or satisfactory.

SUMMARY OF THE INVENTION

In view of the shortcomings and drawbacks of the existing system, the present invention discloses a telecommunication network transmission divergence system and method, combining a transmission load distribution mechanism with a load balance mechanism in order to achieve better transmission performance.

In the present invention packets are transmitted through a high-stability & short-delay link, such as T1/E1 utilizing a first multi-service-packet-control-unit (MSPCU) and a second multi-service-packet-control-unit (MSPCU) as based on packet priority. Also, packets are diverged through multiple routes (ex: switch ports) to the Internet or an Intranet to offload packet transmission flow so as to overcome the problem of insufficient bandwidth and to enhance transmission efficacy.

Another objective of the present invention is to provide a telecommunication network transmission divergence system and method where transmission flow of each divergence is balanced through a load balance mechanism to achieve stable Quality of Service (QoS).

A further objective of the present invention is to provide a system and method wherein a plurality of packets are encapsulated into a Jumbo Frame, so as to raise the efficiency of packet transmission.

In order to achieve the above mentioned objectives, the present invention provides a telecommunication network transmission divergence system and method. At least one base station (Node B) in a Universal Mobile Telecommunications System (UMTS) system sends out at least one packet. A first multi-service-packet-control-unit (MSPCU) receives the packet and transmits the packet to a second multi-service-packet-control-unit (MSPCU) through a Frame Exchange Protocol Interface (Iub) as based on the priority of the packet or diverges the packet to the Internet or an Intranet through a divergent route. The packet will then be converged back to the second multi-service-packet-control-unit (MSPCU) through a convergent route. Finally, the second multi-service-packet-control-unit (MSPCU) will transmit the packet to a Radio Network Controller (RNC) to reorganize the packet.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a telecommunication network transmission divergence system and method. A first multi-service-packet-control-unit (MSPCU) and a second multi-service-packet-control-unit (MSPCU) are arranged between a base station (Node B) and a Radio Network Controller (RNC) for diverging packet transmission. The system and method reduce load on transmission equipment and lower transmission cost while maintaining a stable transmission quality. In the following, the technical characteristics of the present invention will be described in the preferred embodiments.

Figure 1:
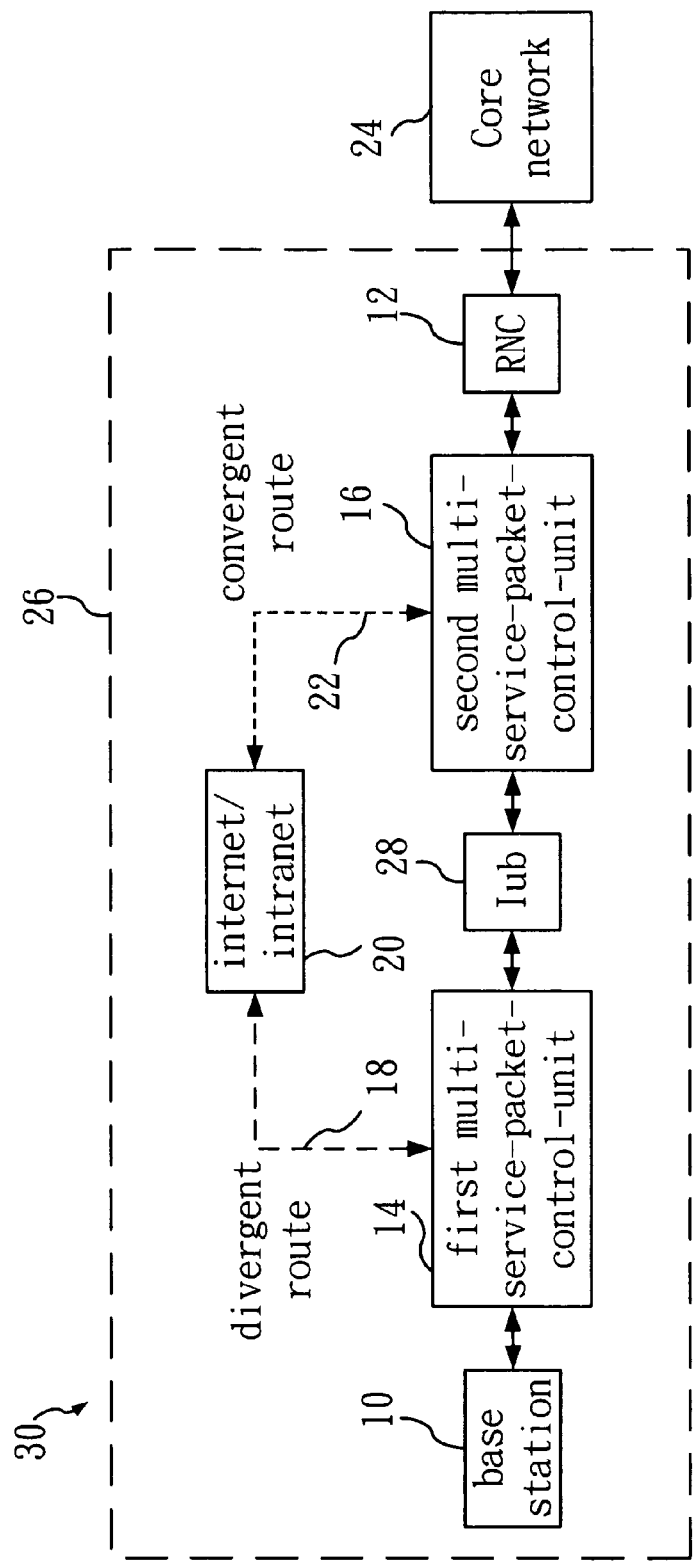
FIG. 1 is a diagram illustrating a system architecture of telecommunication network transmission divergence system according to an embodiment of the present invention.

Refer to FIG. 1 for a diagram of a system architecture of a telecommunication network transmission divergence system according to the present invention. As shown in FIG. 1, a Universal Mobile Telecommunications System (UMTS) 30 comprises a Terrestrial Radio Access Network of UMTS (UTRAN) 26 and a core network 24. The Terrestrial Radio Access Network of UMTS (UTRAN) 26 comprises at least one base station (Node B) 10 that is used to send out at least one packet to a first multi-service-packet-control-unit (MSPCU) 14 connected to the base station 10 Then the first multi-service-packet-control-unit (MSPCU) 14 will transmit the packet to a Frame Exchange Protocol Interface (Iub) 28 which is connected to a second multi-service-packet-control-unit (MSPCU) 16. The packet will be transmitted to the second multi-service-packet-control-unit (MSPCU) 16 via the Frame Exchange Protocol Interface (Iub) 28. Alternatively, the first multi-service-packet-control-unit (MSPCU) 14 will diverge the packet via a divergent route 18 to the Internet or an Intranet 20. Then the packet will be converged to the second multi-service-packet-control-unit (MSPCU) 16 via a convergent route 22. The second multi-service-packet-control-unit (MSPCU) 16 will converge and transmit the packet to a Radio Network Controller (RNC) 12 that will reorganize the packet and send it to a core network 24.

The first multi-service-packet-control-unit (MSPCU) 14 and the second multi-service-packet-control-unit (MSPCU) 16 can be monolithically disposed or they can be integrated respectively into a base station (Node B) 10 and a Radio Network Controller (RNC) 12. In addition, the first multi-service-packet-control-unit (MSPCU) 14 and the second multi-service-packet-control-unit (MSPCU) 16 are provided with a caching mechanism, a filtering mechanism, and a compression mechanism, so as to reduce the bandwidth utilized and shorten the response delay. Virus detection and packet compression are provided to increase packet transmission efficiency.

Additionally, the first multi-service-packet-control-unit (MSPCU) 14 and the second multi-service-packet-control-unit (MSPCU) 16 are provided with a Jumbo Frame Mechanism that is used to encapsulate a plurality of packets into a Jumbo Frame having a single header so as to reduce header overhead and raise packet transmission efficacy. For example, in an Ethernet transmission, the frame size upper limit can be increased from 1500 bytes to 9000 bytes through utilizing the Jumbo Frame mechanism. In the first multi-service-packet-control-unit (MSPCU) 14 and the second multi-service-packet-control-unit (MSPCU) 16 a plurality of packets can be encapsulated into a large Ethernet Frame so that a plurality of frames/headers originally required in transmitting a plurality of packets are converted into requiring only a Jumbo Frame/header in transmitting a plurality of packets.

In the Universal Mobile Telecommunications System (UMTS) 30 architecture described above, the transmission mode between the respective elements is bi-directional. In the following, a divergent transmission method implemented through utilizing the arrangement of the first multi-service-packet-control-unit (MSPCU) 14 and the second multi-service-packet-control-unit (MSPCU) 16 will be described in detail.

Figure 2:
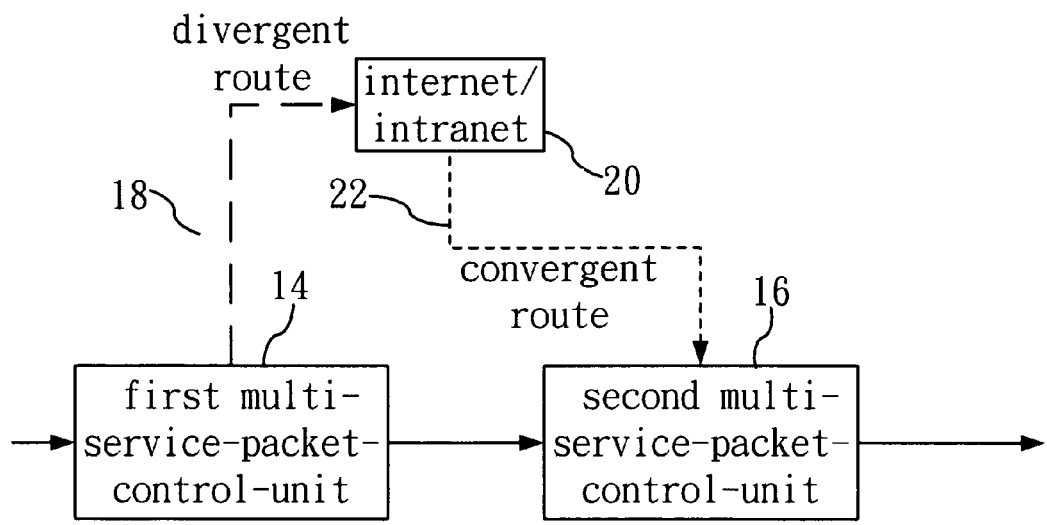
FIG. 2 is a diagram illustrating a packet divergent route between the first multi-service-packet-control-unit (MSPCU) and the second multi-service-packet-control-unit (MSPCU) according to an embodiment of the present invention.

Refer to FIG. 2 for a diagram of packet divergent route between the first multi-service-packet-control-unit (MSPCU) and the second multi-service-packet-control-unit (MSPCU) according to the present invention as well as to FIG. 1. When a packet is transmitted to the first multi-service-packet-control-unit (MSPCU) 14 the packet is diverged by the first MSPCU 14 to the Internet or an Intranet 20 through a divergent route 18. Then the packet is transmitted to the second multi-service-packet-control-unit (MSPCU) 16 through a convergent route 22 and it is then transmitted to a Radio Network Controller (RNC) 12 to proceed with packet reorganization. Through the convergent route 22, the packet diverged from the first multi-service-packet-control-unit (MSPCU) 14 to the Internet or an Intranet 20, is converged back to the second multi-service-packet-control-unit (MSPCU) 16 so that the packet can be further processed and transmitted. A Virtual Private Network Tunnel is provided as a path over the divergent route 18, the Internet or an Intranet 20, and the convergent route 22 to ensure packet transmission security. For upper level transmission the following ways can be utilized: (1) For example, transmission control protocol (TCP) can be utilized to achieve reliable transmission. The IP/UDP/FP packets are treated as payload and are transmitted utilizing transmission control protocol (TCP) and are transmitted in an IP/TCP/IP/UDP/FP format. Alternatively, a TCP link is established to replace UDP and the packets are transmitted in an IP/TCP/FP format. Both of the above two ways may be used to ensure the reliability of packet transmission, however, the former has the addition of header overhead of IP and TCP which adversely affects its efficacy. The latter way does not have this adverse effect but its application is more complicated. (2) Alternatively, after revising the IP address of the destination and User Data Protocol (UDP) port number, the packet is transmitted in an IP/UDP/FP format. However, in this way the transmission reliability can not be guaranteed and it is possible that the packet will be lost.

In addition, in order to ensure the Quality of Service (QoS) of the diverged packet transmission, a Differentiated Service and an Offloading Link Utilization are utilized in cooperation with the divergent transmission mechanism. In the following, the Differentiated Service and the Offloading Link Utilization will be described in further detail.

The Differentiated Service is performed in such a way that packets of the highest priority are transmitted first. In implementing the Differentiated Service, the priorities of the packets to be transmitted have to be classified first so that packets can be transmitted according to their priorities.

Figure 3:
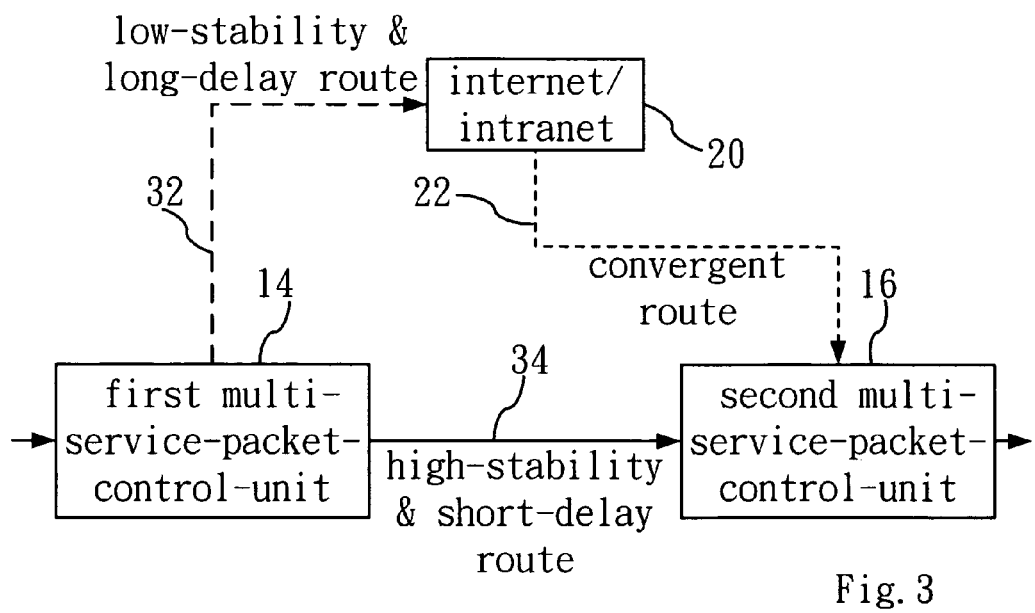
FIG. 3 is diagram illustrating a differential service transmission route according to an embodiment of the present invention.

Refer to FIG. 3 for a diagram of a transmission route of Differential Service according to the present invention. As shown in FIG. 3, high priority packets such as VoIP (Voice over IP) are transmitted directly through a high-stability & short-delay route 34 between the first multi-service-packet-control-unit (MSPCU) 14 and the second multi-service-packet-control-unit (MSPCU) 16. Low priority packets are transmitted through a low-stability & long-delay route 32 of a divergent route 18 to the Internet or an Intranet 20, and then the packet is converged to the second multi-service-packet-control-unit (MSPCU) 16 through a convergent route 22. When the bandwidth of the high-stability & short-delay route is not sufficient, the high priority packets can also be transmitted through the low-stability & long-delay route. The low-stability & long-delay route is, for example, xDSL, FTTX, PON (Passive Optical Network), WiFi (Wireless Fidelity), etc.

In the above description, the packet transmission of Differentiated Service is explained. In the following, the determination of priority of the packet to be transmitted will be described.

Figure 4A:
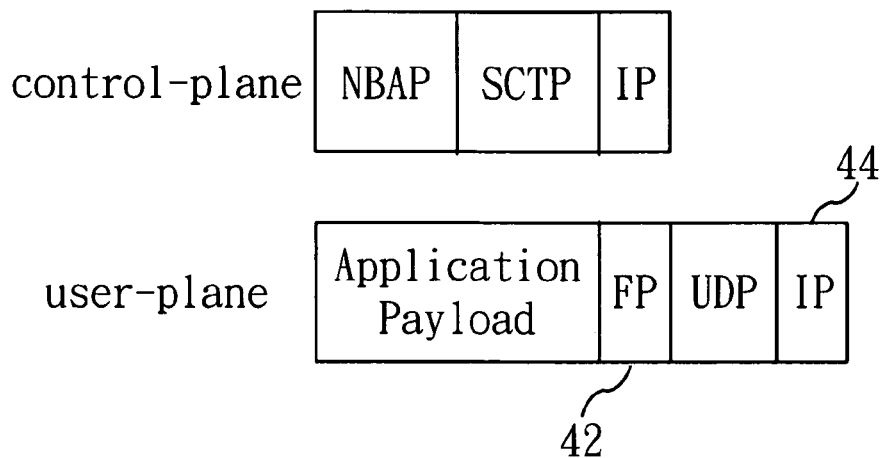
FIG. 4(a) is a diagram illustrating formats of a control-plane packet and a user-plane packet according to an embodiment of the present invention.

Refer to FIG. 4(a) for a diagram of formats of a control-plane packet and a user-plane packet according to the present invention. As shown in FIG. 4(a), a packet can be classified into a control-plane packet or a user-plane packet according to the packet header. The control-plane packet includes a resource allocation instruction and a connection set-up instruction and is provided with a Stream Control Transmission Protocol (SCTP). The user-plane packet is provided with a User Datagram Protocol (UDP). Since the control-plane packet includes a resource allocation instruction and a connection set-up instruction, the priority of a control-plane packet is higher than that of a user-plane packet and the control-plane packet is transmitted through a high-stability & short-delay route 34.

Figure 4B:
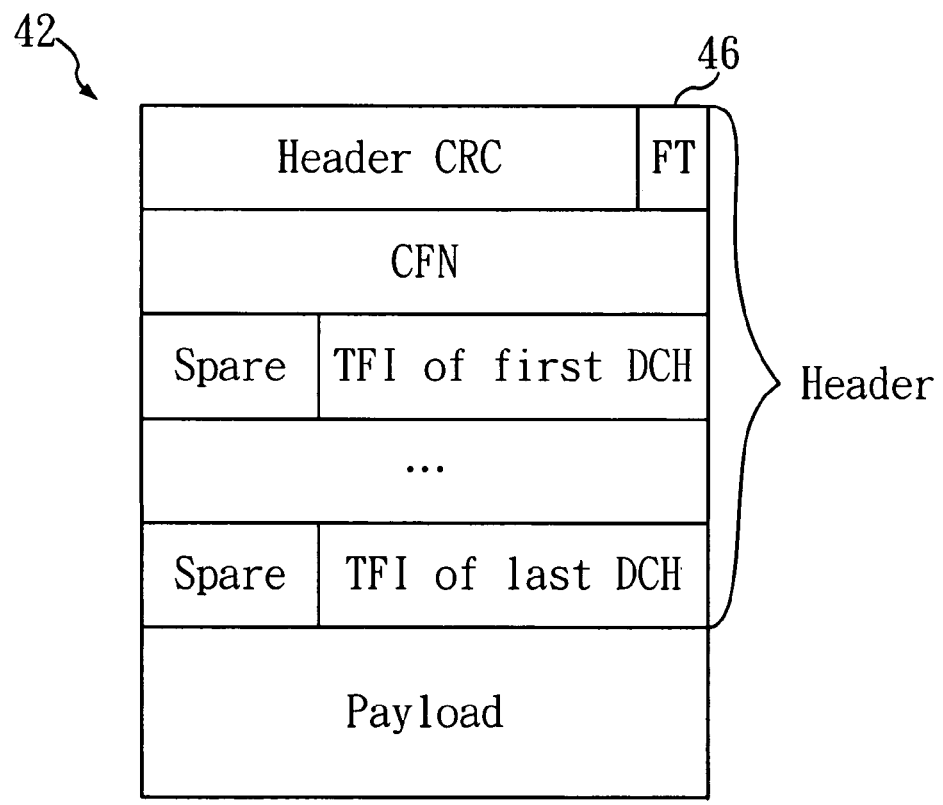
FIG. 4(b) is a diagram illustrating a format of a Frame Protocol (FP) header of a user-plane packet according to an embodiment of the present invention.
Figure 4C:
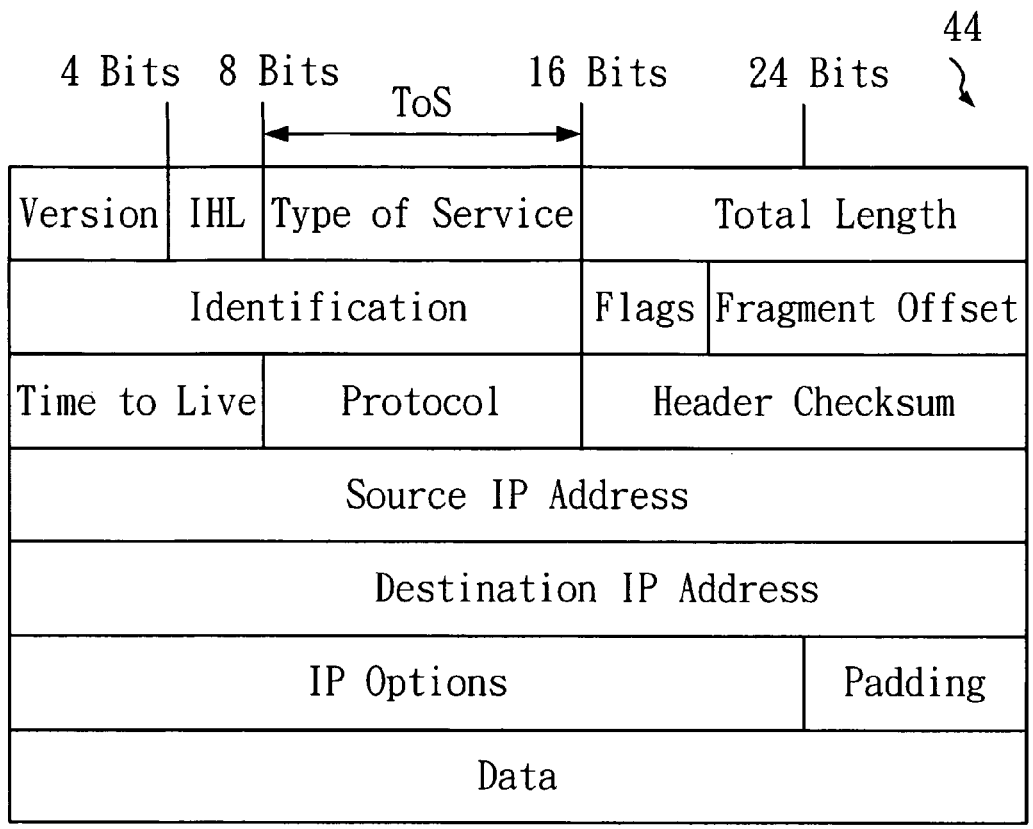
FIG. 4(c) is a diagram illustrating a format of an Internet Protocol (IP) header of a user-plane packet according to an embodiment of the present invention.
Figure 4D:
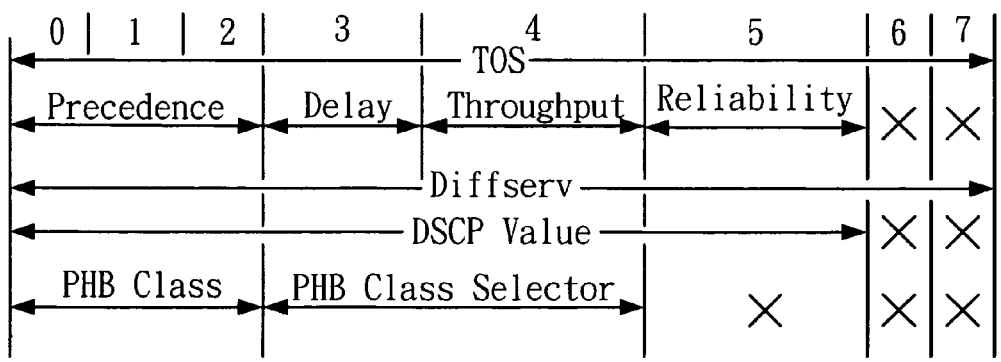
FIG. 4(d) is a diagram illustrating a format of a Type Of Service (TOS) field of an Internet Protocol (IP) header according to an embodiment of the present invention.

In the above description, the classification of a packet into a control-plane packet or a user-plane is explained, however, the user-plane packet can further be classified into a control packet or a data packet. Refer to FIG. 4(b) for a diagram of a format of a Frame Protocol (FP) header of a user-plane packet according to the present invention. Also refer to FIG. 4(a) at the same time. A user-plane packet can be classified into a control packet or a data packet according to the Frame Type (FT) 46 contained in the Frame Protocol (FP) 42 in a header. The control packet includes the timing-related messages: a Time Synchronization message and a Timing Adjustment message; and the data packet is a packet of ordinary data. Since the control packet includes timing-related messages the priority of a control packet is higher than that of a data packet, it is transmitted through a high-stability & short-delay route 34.

In the above description, a user-plane packet is classified as a control packet or a data packet and the priority of the data packet is determined according to the value of Internet Protocol (IP) 44 in a header. As shown in FIG. 4 (c), FIG. 4(d), and FIG. 4 (a), the Internet Protocol (IP) 44 in a header includes a Type of Service (TOS) field. The Type of Service (TOS) field is 8 bits long and includes: 3-bit precedence field, 1-bit delay field, 1-bit throughput field, 1-bit reliability field, and the remaining two bits are reserved. In the case of Differentiated Service, the preceding 6-bits of the Type of Service (TOS) field are used to serve as a DiffServ Code Point (DSCP) value or the preceding 5-bits are used as a Per Hop Behavior (PBH) value. As such, the priority is determined according to the TOS/DSCP/PHB values in the header of a packet.

In addition, in order to avoid the scenario of directing all the packets of high priority to the high-stability & short-delay route without considering that its bandwidth is already overloaded, load distribution is utilized to balance the traffic load transmitted over multiple divergent routes. The load distribution is a kind of load balance mechanism that can be realized through various algorithms, such as Round-Robin, Weighted Round-Robin, Least Connection First, Least Latency First, etc.

In the present invention a first multi-service-packet-control-unit (MSPCU) 14 and a second multi-service-packet-control-unit (MSPCU) 16 are arranged in a Universal Mobile Telecommunications System (UMTS) 30, such that packets are transmitted according to their priorities or packets are transmitted through a divergent route. As a result, communication costs are reduced while quality of service is maintained.

The above detailed description of the preferred embodiments is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A telecommunication network transmission divergence system comprising:
   at least one base station for transmitting at least one packet;
   a first multi-service-packet-control-unit (MSPCU) connected to the base station for transmitting the packet or diverging the packet to a divergent route and transmitting the packet diverged to the divergent route to the Internet or an Intranet; and
   a second multi-service-packet-control-unit (MSPCU) connected to the first multi-service-packet-control-unit through a frame-exchange-protocol interface (Iub) and connected to the Internet or the Intranet;
   wherein, the packet transmitted by the first multi-service-packet-control-unit is transmitted to the second multi-service-packet-control-unit via the frame-exchange-protocol interface, the packet diverged to the Internet or the Intranet is converged to the second multi-service-packet-control-unit through a convergent route, and the second multi-service-packet-control-unit then transmits the packet to at least one Radio Network Controller (RNC); and
   the first multi-service-packet-control-unit and the second multi-service-packet-control-unit are each provided with a caching mechanism for reducing use of bandwidth and shortening response delay, a filtering mechanism for performing virus detection, and a compression mechanism for compressing the packet.

2. The telecommunication network transmission divergence system as claimed in claim 1, wherein the Radio Network Controller (RNC) reorganizes the packet transmitted from the second multi-service-packet-control-unit and then transmits the reorganized packet to a core network.

3. The telecommunication network transmission divergence system as claimed in claim 1, wherein the first multi-service-packet-control-unit is integrated into the base station and the second multi-service-packet-control-unit is integrated into the Radio Network Controller (RNC).

4. The telecommunication network transmission divergence system as claimed in claim 1, wherein the first multi-service-packet-control-unit and the second multi-service-packet-control-unit are each provided with a Jumbo Frame mechanism for encapsulating a plurality of packets into a Jumbo Frame.

5. A telecommunication network transmission divergence method, comprising the following steps:
   transmitting a packet to a first multi-service-packet-control-unit, the first multi-service-packet-control-unit for transmitting the packet or diverging the packet to the Internet or an Intranet through a divergent route;
   transmitting the packet to a second multi-service-packet-control-unit and the diverged packet is converged to the second multi-service-packet-control-unit through a convergent route; and
   transmitting the packet by the second multi-service-packet-control-unit to at least one Radio Network Controller for reorganization of the packet;
   wherein the divergent route is used to achieve Quality of Service (QoS) of packet transmission through Differentiated Service and Offloading Link Utilization, said Differentiated Service is obtained by classifying priorities of the packets; and transmitting high priority packets by at least one high-stability and short-delay route between the first multi-service-packet-control-unit and the second multi-service-packet-control-unit.

6. The telecommunication network transmission divergence method as claimed in claim 5, wherein a Virtual Private Network Tunnel is provided as a path over the divergent route, the Internet or the Intranet, and the convergent route.

7. The telecommunication network transmission divergence method as claimed in claim 5, wherein low priority packets are first diverged to the Internet or the Intranet via at least one divergent route and then converged to the second multi-service-packet-control-unit via the convergent route.

8. The telecommunication network transmission divergence method as claimed in claim 7, wherein the divergent route is a low-stability & long-delay route.

9. The telecommunication network transmission divergence method as claimed in claim 5, wherein Differentiated Service is realized through classifying the packet as a control-plane packet or a user-plane packet and the priority of the control-plane packet is higher than that of the user-plane packet.

10. The telecommunication network transmission divergence method as claimed in claim 9, wherein the control-plane packet comprises a resource allocation instruction and a connection set-up instruction.

11. The telecommunication network transmission divergence method as claimed in claim 9, wherein the user-plane packet is classified as a control packet or a data packet and the priority of the control packet is higher than that of the data packet.

12. The telecommunication network transmission divergence method as claimed in claim 11, wherein the control packet comprises a time synchronization message and a timing adjustment message.

13. The telecommunication network transmission divergence method as claimed in claim 11, wherein the priority of the data packet is dependent on values of header fields of the data packet.

14. The telecommunication network transmission divergence method as claimed in claim 5, further comprising a step of load distribution being a load balance mechanism for balancing traffic load of the packets transmitted via at least one divergent route.

15. The telecommunication network transmission divergence method as claimed in claim 14, wherein the load balance mechanism comprises various algorithms including round-robin, weighted round-robin, least number of connections first, or lowest latency first.

* * * * *